United States Patent
Onyshkevych et al.

(10) Patent No.: US 6,665,577 B2
(45) Date of Patent: Dec. 16, 2003

(54) SYSTEM, METHOD AND ARTICLE OF MANUFACTURE FOR AUTOMATED FIT AND SIZE PREDICTIONS

(75) Inventors: Vsevolod A. Onyshkevych, Princeton, NJ (US); Christopher B. Dingle, New York, NY (US); Matthew S. Clark, Ithaca, NY (US); Bonny J. Carmicino, Florham Park, NJ (US); Mads V. Pedersen, Toms River, NJ (US)

(73) Assignee: My Virtual Model Inc., Montreal (CA)

( * ) Notice: Subject to any disclaimer, the term of this patent is extended or adjusted under 35 U.S.C. 154(b) by 0 days.

(21) Appl. No.: 10/028,589

(22) Filed: Dec. 20, 2001

(65) Prior Publication Data

US 2002/0138170 A1 Sep. 26, 2002

Related U.S. Application Data

(60) Provisional application No. 60/256,806, filed on Dec. 20, 2000.

(51) Int. Cl.[7] .............................................. G06F 19/00
(52) U.S. Cl. .......................................... 700/130; 705/26
(58) Field of Search ................................. 700/130, 131, 700/132; 705/1, 26; 707/4, 104.1; 396/3

(56) References Cited

U.S. PATENT DOCUMENTS

| | | | | |
|---|---|---|---|---|
| 5,956,525 A | * | 9/1999 | Minsky | 396/3 |
| 6,353,770 B1 | * | 3/2002 | Ramsey | 700/131 |
| 6,415,199 B1 | * | 7/2002 | Liebermann | 700/132 |

* cited by examiner

*Primary Examiner*—Peter Nerbun
(74) *Attorney, Agent, or Firm*—Goodwin Procter LLP

(57) ABSTRACT

The present invention relates to an automated system, method and article of manufacture for determining the most appropriate fit and size of a garment, based on either or both customer preference or/and set objective criteria, for a particular garment dimension or a plurality of garment dimensions as they relate to a consumer body dimension or dimensions and the ideal body dimension or dimensions for that garment or for a range of garments.

36 Claims, 5 Drawing Sheets

| | size 8 | size 10 | size 12 | size 14 |
|---|---|---|---|---|
| waist | 0 | .6 | 1.0 | .4 |
| high hip | .7 | 1.0 | .8 | .5 |
| hip | .8 | 1.0 | .9 | .5 |
| rise | .7 | 1.0 | .8 | .4 |
| thigh | 1.0 | 1.0 | 1.0 | .8 |
| calf | 1.0 | 1.0 | 1.0 | 1.0 |
| inseam | 1.0 | 1.0 | 1.0 | 1.0 |
| Garment Fit Ratings: | 0 | .60 | .58 | .03 |
| Star Rating: | [none] | *** | *** | * |

Fig. 3

|  | size 8 | size 10 | size 12 | size 14 |
|---|---|---|---|---|
| waist | 0 | .6 | 1.0 | .4 |
| high hip | .7 | 1.0 | .8 | .5 |
| hip | .8 | 1.0 | .9 | .5 |
| rise | .7 | 1.0 | .8 | .4 |
| thigh | 1.0 | 1.0 | 1.0 | .8 |
| calf | 1.0 | 1.0 | 1.0 | 1.0 |
| inseam | 1.0 | 1.0 | 1.0 | 1.0 |
| Garment Fit Ratings: | 0 | .60 | .58 | .03 |
| Star Rating: | [none] | *** | *** | * |

SYSTEM, METHOD AND ARTICLE OF MANUFACTURE FOR AUTOMATED FIT AND SIZE PREDICTIONS

RELATED UNITED STATES APPLICATIONS/ CLAIM OF PRIORITY

This application incorporates by reference in its entirely as if set forth at length herein and claims priority of U.S. provisional patent application 60/256,806 entitled "System, Method and Article of Manufacture for Automated Fit and Size Predictions" and filed on Dec. 20, 2000.

FIELD OF THE INVENTION

This invention relates to a system, method and article of manufacture for determining the appropriate fit and size of a garment on a customer and providing appropriate garment selections to meet a customer's needs.

BACKGROUND OF THE INVENTION

The traditional way to determine whether clothes fit is to take them into a fitting room and try them on. For a variety of reasons, including the growth of mail order and Internet shopping methods, the need for a more efficient in-store method for finding clothes that fit (for oneself and for others) and associated restocking costs, the purchase of garments for family members, and the need for a more efficient method for choosing garments to try on, the present automated method for size and fit prediction invention of the present invention is very useful. In the prior art, a size table, such as those, which may be included in a catalog, is a very rudimentary form of size prediction. In addition, an automated size table still just bases size and fit recommendations solely on size table information. Basing a fitting recommendation solely on size table information means that for a given garment brand, the same fitting recommendation will be given regardless of the garment cut. For example, if a given brand sells both a slim cut pair of pants and a loose-fitting pair of trousers, the same size recommendation will always be returned for each of the two pairs of pants. This leads to incorrect results when a customer might, for example, have a waist that fits best in a size 8, and hips that fit best in a size 10. Such a customer would wear a size 10 in slim cut pants, which have a good fit in the hips and loose fit in the waist, and a size 8 in the looser-fitting trousers, which have a good fit in the waist and wearable fit in the hips. For more accurate size prediction, it is necessary to go beyond size charts and look at the actual dimensions of the garments themselves.

Prior art patents have attempted to solve these problems associated with determining an accurate fit for garments on a customer. The U.S. Pat. No. 5,930,769 patent teaches a method for electronic fashion shopping using a computer whereby an individual's body type is determined based upon that individual's body measurements. However, the '769 patent relies upon size tables and requires the customer to answer questions to determine a fashion category when determining appropriate garments for a customer. As described more fully below, the present invention solves the problems of the '769 patent by using a fit prediction system and method taking into consideration the ideal fit of a garment in addition to the garment measurement and the customer's body measurements.

The U.S. Pat. No. 5,680,528 patent also describes an automated method for determining the fit of a garment on a customer. However, this patent teaches a digital dressing room in which a computer overlays a garment on top of a customer's body dimensions. FIGS. 5A though 5F and 39B show how fit is determined in the '528 patent. Again, the '528 patent employs the use of tables to determine garment fit on a customer. Such methods do not adequately account for actual customer body measurements as compared to the actual garments themselves.

The present invention solves these and other problems by using a fit prediction system and method that looks at the garments themselves, properly evaluating fit in different areas, properly returning different results for different cuts of garments. With this system and method, the present invention goes beyond size prediction to actually tell how well specific garments will fit. When one moves beyond size tables, however, it becomes very difficult to create a scaleable product with a methodology that can be automatically applied to new garments, without manual intervention. Before developing the system and method described in further detail below, the fitting tolerances were developed individually for each garment, using a time-consuming empirical method. Fitting tolerances were then assigned to specific garment categories and sub-categories, meaning that specific categorization of new garments was critical to accuracy of results. Prior to the advances enabled by the present invention described herein, it was a very time consuming process to add additional garments to a size-prediction system. The system and method described herein are a breakthrough in that they provide a generalized format that can be applied to any garment, resulting in an accurate size and fit prediction without empirical methods of determining the range of body sizes and shapes which will fit into a particular size garment. In addition, the system and methods described herein can be used to select and purchase garment both remotely or in a bricks and mortar retail store tailored to suit a customer's preferences and body shape in a more efficient manner.

SUMMARY OF THE INVENTION

In accordance with one aspect of the present invention there is provided a system, method and article of manufacture for predicting the fit and size of a garment on a customer for a particular garment dimension or a plurality of garment dimensions as they relate to a customer body dimension or dimensions and the ideal body dimension or dimensions for that garment.

Customer body dimensions may be obtained by scanning the individual's body, obtaining body measurements using an electronic tape measure or allowing a customer to provide measurements as taken using a conventional tape measure.

The system and method may be used to provide garment selections based upon a customer's body shape, personal preferences and prior purchasing history. The system can maintain a database to continuously provide improved garment selections to meet customers' needs.

These and other aspects, features and advantages of the present invention will become better understood with regard to the following description and accompanying drawings.

BRIEF DESCRIPTION OF THE DRAWINGS

Exemplary embodiments of the present invention are now briefly described with reference to the following drawings:

FIG. 3 is Table of Sample Dimensional Fit Ratings, Garment Fit Ratings, and Star Ratings.

DETAILED DESCRIPTION OF THE INVENTION

Figure 1:
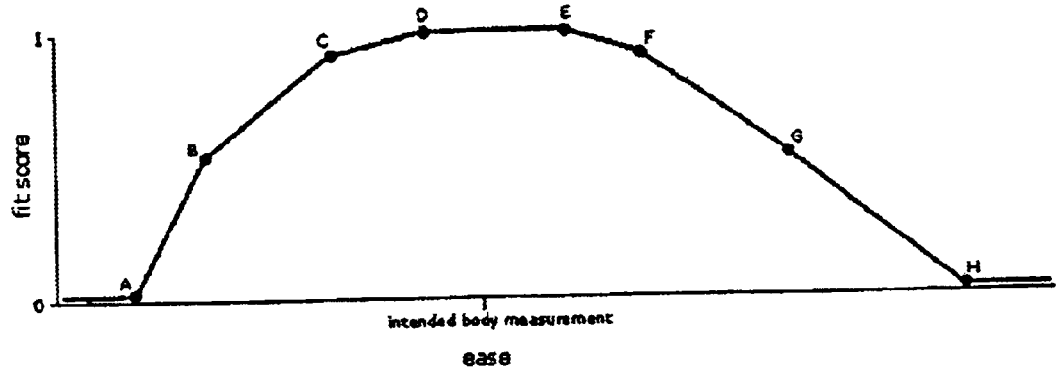
FIG. 1 is a fit curve to obtain a fit score based upon ease for a Primary Dimension, with optional Inflection Points.

In the following detailed description of the embodiments, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is therefore, not to be taken in a limiting sense, and the scope of the present inventions is defined only by the appended claims. The leading digit(s) of the reference numbers in the Figures usually correspond to the figure number, with the exception that identical components, which appear in multiple figures are identified by the same reference numbers.

For each garment dimension, there is an ideal or intended size for that garment, and a range around that where the fit is still unquestionably fine; this range can all be considered a "perfect" fit and measurements within this range receive a perfect fit score. Moving to one side of the "perfect" range, the garment becomes progressively tighter and, although the garment is a bit snug, there is still an acceptable fit; this area should receive a progressively declining fit score. On the other side of the "perfect" range, the garment becomes progressively looser, and, although the garment is loose, there is still an acceptable fit; this area should get a progressively declining fit score. Throughout these ranges—from snug to tight—the garment is within the "wearable" range. Beyond these ranges, the garment becomes unwearable—either unwearably small or unwearably large. For each dimension, a fit score is returned. In the perfect fit areas, the score is 1; in the unwearable areas, the score is 0; in the dimensions where the garment is wearable but not perfect, a score of between 0 and 1, non-inclusive, is returned. An alternative scoring structure where an unwearably tight garment is scored −1, a perfectly-fitting garment is scored 0 and an unwearably loose garment is scored +1, is also possible. If the scoring is calculated in ranges other than from 0 to 1, the score can be normalized to a 0 to 1 range for combinatorial purposes as 1-ABS(score).

Once fit is evaluated in applicable areas, the fit scores are combined using, for example, a multiplicative model. Accordingly, in one embodiment, if the fit score is 0 in any dimension (i.e., the garment is unwearable in any dimension), the final fit score will be 0, indicating an unwearable garment. If a garment has a fit score of 1 for all dimensions (i.e., the garment fits perfectly in all dimensions) the final fit score will be 1, indicating a perfect fit. If the garment is wearable in all dimensions, albeit possibly not a great fit in some of them, the final fit score will be between 0 and 1; the closer to 1, the better the fit, the closer to 0, the worse the fit. The combined fit score can be further refined by weighting the individual components of the fit score (with more-critical dimensions weighted upwards and less-critical or partially-redundant dimensions weighted downward). The formula for computing the fit score can be normalized to the number of dimensions which are present by taking the nth root of the resulting product, n being a formula based, in part, on the individual weights. Other mechanisms for combining the individual fit scores are also feasible, ranging from an arithmetic mean (for fast computation) to a multinomial function which statistically compensates for colinearity between dimensions within the equation.

The final fit score, ranging from 0 and 1, inclusive, is then normalized to a multiple-star rating system or other easily understood rating system. However, in other embodiments, which would be apparent to one skilled in the art, fit scores can range from numbers other than between 0 to 1.

I. The Present Invention Takes into Consideration the Following Factors:

a. Preferably, fitting tolerances may be broad enough so that, if a consumer is within a size range and falls between two sizes, they should not be told that the larger size is too big and the smaller one is too small. An exception to this is the "one size fits all" garment that does not actually fit all.

b. Preferably, fitting tolerances may be tight enough that a consumer is not told that multiple sizes are a perfect fit. However, more than one less than perfect results may be present.

c. When a garment is loosely fitted in a certain dimension (i.e., the waist on a boxy tunic) preferably the garment fit rating should not be diminished by a larger-than-intended body measurement in that dimension, within limits.

II. Key Terms

The following terms are used herein to more fully describe the system and method; some are standard clothing industry terms and some were coined specifically for the present invention.

Adjusted Excess Ease: The amount by which Intended Ease exceeds Minimum Ease, after applying Fabric Factors and personal Preference Factors.

Adjusted Garment Dimensions: Garment Dimensions adjusted for Fabric Factors.

Body Type: The general categorization of people based on age and gender. These include women, men, young/teen women, young/teen men, girls, boys, toddlers, and infants.

Constants: The following constants may be used in equations describing the system and method. These constants can be adjusted, as required, based on the results of benchmarking exercises, tuning these coefficients to match the statistical results in a given sample population. Accordingly, the constants used herein are merely exemplary of constants for a particular embodiment. It would be understood by one of ordinary skill in the art to employ different constants consistent with a particular population. "Higher" and "lower" refer to amounts of ease. In the Curves, Ease increases along the x-axis, and Body Measurement decreases.

| Constant Name | Value | Use - Primary Dimensions | Use - Secondary Dimensions |
|---|---|---|---|
| $B_{1-}$ | .02 | N/A | When multiplied by Adjusted Excess Ease, is added to IBM to give Inflection Point D, unless a lower value of D is determined by $E_{1-}$, below. |

-continued

| Constant Name | Value | Use - Primary Dimensions | Use - Secondary Dimensions |
|---|---|---|---|
| $B_{1+}$ | .02 | N/A | When multiplied by the lesser of Adjusted Excess Ease and Excess Ease, is subtracted from IBM to give Inflection Point E, unless a higher value of E is determined by $E_{1+}$, below. |
| $B_{2-}$ | .04 | N/A | When multiplied by Adjusted Excess Ease, is added to IBM to give Inflection Point B, unless a lower value of B is determined by $E_{2-}$, below. |
| $B_{2+}$ | .04 | N/A | When multiplied by the lesser of Adjusted Excess Ease and Excess Ease, is subtracted from IBM to give Inflection Point G, unless a higher value of G is determined by $E_{2+}$, below. |
| $B_{3-}$ | .05 | N/A | When multiplied by Adjusted Excess Ease, is added to IBM to give Inflection Point A, unless a lower value of A is determined by $E_{3-}$, below. |
| $E_{1-}$ | .4 | When multiplied by Adjusted Excess Ease, is added to IBM to give Inflection Point C, if C is less than D; otherwise omit Inflection Point C | When multiplied by Adjusted Excess Ease, is added to IBM to give Inflection Point D, unless a lower value of D is determined by $B_{1-}$, above. |
| $E_{1+}$ | .4 | When multiplied by the lesser of Adjusted Excess Ease and Excess Ease, is subtracted from IBM to give Inflection Point F, if F is greater than E; otherwise omit Inflection Point F | When multiplied by Excess Ease, is subtracted from IBM to give Inflection Point E, unless a higher value of E is determined by $B_{1+}$, above. |
| $E_{2-}$ | .8 | When multiplied by Adjusted Excess Ease, is added to IBM to give Inflection Point B, unless a lower value of B is obtained from $G_{2-}$, below. | When multiplied by Adjusted Excess Ease, is added to IBM to give Inflection Point B, unless a lower value of B is determined by $B_{2-}$, above. |
| $E_{2+}$ | .8 | When multiplied by the lesser of Adjusted Excess Ease and Excess Ease, is subtracted from IBM to give Inflection Point G, unless a higher value of G is obtained from $G_{2+}$, below. | When multiplied by Excess Ease, is subtracted from IBM to give Inflection Point G, unless a higher value of G is determined by $B_{2+}$, above. |
| $E_{3-}$ | 1.0 | When multiplied by Adjusted Excess Ease, is added to IBM to give Inflection Point A, unless a lower value of A is obtained from $G_{3-}$, below. | When multiplied by Adjusted Excess Ease, is added to IBM to give Inflection Point A, unless a lower value of A is determined by $B_{3-}$, above. |
| $E_{3+}$ | 1.2 | When multiplied by the lesser of Adjusted Excess Ease and Excess Ease, is subtracted from IBM to give Inflection Point H, unless a higher value of H is obtained from $G_{3+}$. | N/A |
| $G_{1-}$ | .5 | When multiplied by Grade, is added to IBM to give Inflection Point D | N/A |
| $G_{1+}$ | .5 | When multiplied by Grade, is subtracted from IBM to give Inflection Point E. | N/A |
| $G_{2-}$ | 1.0 | When multiplied by Grade, is added to IBM to give Inflection Point B, unless a lower value of B is obtained from $E_{2-}$, above. | N/A |
| $G_{2+}$ | 1.0 | When multiplied by Grade, is subtracted from IBM to give Inflection Point G, unless a higher value of G is obtained from $E_{2+}$, above. | N/A |
| $G_{3-}$ | 1.25 | When multiplied by Grade, is added to IBM to give Inflection Point A, unless a lower value of A is obtained from $E_{3-}$, above. | N/A |
| $G_{3+}$ | 1.5 | When multiplied by Grade, is subtracted from IBM to give Inflection Point H, unless a higher value of H is obtained from $E_{2+}$, above. | N/A |

Curve: The graphical representation, by dimension, of the fit scores for different body sizes in a particular dimension, for a given size garment. Along the x-axis, Ease increases and body measurement decreases; along the y-axis, Dimensional Fit Rating increases, for example, from 0 to 1. The Inflection Points of the Curves vary by garment size, garment style, Grade, and Fabric Factors and personal Preference Factors. Curves are piecewise linear. Ease increases along the x-axis and Dimensional Fit Rating increases along the y-axis. Body dimension decreases along the x-axis. Accordingly, as you move left along the curve, the garment gets tighter; as you move right along the curve, the garment gets looser.

Dimensional Fit Rating: The Fit Rating assigned to the fit for a particular garment style for a particular size for a particular dimension.

Ease: The amount that a garment is bigger than the body that wears it.

Excess Ease: The amount by which Intended Ease exceeds Minimum Ease, prior to applying Fabric Factors and personal Preference Factors.

Fabric Factors: Fabric characteristics that impact the fit of garments.

Fit Model: The person who tries on garments for the vendor to test fit; the person or body shape for whom the garment was designed.

Fit Rating: Dimensional Fit Rating or Garment Fit Rating. In a preferred embodiment, has a range from 0 to 1, inclusive.

Fitting Dimensions: The full set of dimensions that are supported to fit a particular garment. These dimensions vary by garment type. These may include Required Fitting Dimensions, Primary Dimensions, Secondary Dimensions. Only the Required Fitting Dimensions are needed to do a first-level fit of a garment.

Garment Dimensions: Garment dimensions (from Spec Sheets) prior to adjustment for Fabric Factors and personal Preference Factors.

Garment Fit Rating: The combination of all Dimensional Fit Ratings for a particular size and style of garment; the indicia of "goodness of fit" for that size and style of garment.

Grade: The amount that the garment measurement changes between sizes. Grade is dimension-dependant, and need not be constant. For example, the bust grade for a garment might be 1" between sizes for sizes 2 to 10, and 1½ between sizes for sizes 10 to 16. When the garment is available in S/M/L, the grade is often twice, or more, the size of the grade when the garment is available in numbered sizes. When the term "Grade" is used herein, it refers to the Grade for that garment, for that dimension, for that size, as it approaches the next larger or smaller size, as applicable. In the above example, if you are establishing the curve for the bust for a size 10, the "tight" size of the Curve will use 1" for the Grade and the "loose" side of the curve will use 1½ for the Grade. If the Grade is null (i.e., a garment which is "one size fits all") or is greater than 10% of Intended Body Measurement, use 10% of Intended Body Measurement for Grade.

Inflection Points: The points on the Curves separating Linear Segments. The Optional Inflection Points only exist where the garment has comparatively large amount of Intended Ease in a Primary Dimension and a comparatively small Grade. See also Linear Segment.

Intended Body Measurement ("IBM"): The intended body measurement for a particular size in a particular dimension for a particular garment, based on the Intended Ease for that garment in that dimension.

Intended Ease: The amount of ease that the designer intended the garment to have. This is determined by subtracting the Fit Model measurement from the Sample Size garment measurement at the applicable dimension. This is expressed as a percentage, so that larger sizes appropriately have more ease and smaller sizes appropriately have less.

Linear Segments: The portions of the Curves between Inflection Points, as named below. Dimensional Fit Ratings are provided using a fit range of 0 to 1, in this embodiment.

| Linear Segment | Dimensional Fit Rating | Start Inflection Point | End Inflection Point |
|---|---|---|---|
| Unwearably Small | 0 | −∞ | A |
| Small but Marginally Wearable | 0 to .5 | A | B |
| Small but Wearable | .5 to .95 or .5 to 1.0 | B | C or D |
| Just Under Perfect | .95 to 1.0 | C | D |
| Perfect | 1.0 | D | E |
| Just Over Perfect | 1.0 to .95 | E | F |
| Loose but Wearable | .95 to .5 or 1.0 to .5 | F or E | G |
| Loose but Marginally Wearable | .5 to .05 | G | H |
| Unwearably Loose | .05 | H | +∞ |

The Just Under Perfect Segment only exists if Optional Inflection Point exists for that garment for that dimension. The Just Over Perfect Segment Only exists if Optional Inflection Point exists for that garment for that dimension. In addition, for Secondary Dimensions, the Loose But Marginally Wearable segment is a constant (i.e., 0.5). Furthermore, the Unwearably Loose segment does not exist for Secondary Dimensions.

Minimum Ease: A general minimum ease necessary to wear a garment, which is modeled in a particular embodiment at 5%. However, depending on design, some garments (i.e., a pair of jeans designed to be skin-tight and actually compress the body) may have less ease than this.

Personal Preference Factor. Personal Preferences for tighter or looser fit that affect the amount of ease an individual prefers or tolerates.

Primary Dimensions: Fitting Dimensions that can make a garment unwearable if the garment is either too small or too big in that dimension.

Required Fitting Dimensions: Fitting Dimensions that are required to produce a first-level fit for a garment. Required Fitting Dimensions vary by Garment Type and by Body Type (i.e., the hip/seat is a Required Fitting Dimension for women, but not for men).

Sample Size: The garment size that the vendor gets a pre-production sample of to check conformity to specs; the size that fits the Fit Model.

Secondary Dimensions: Dimensions that can make a garment unwearable if the garment is too small in the dimension, but do not make the garment unwearable if the garment is too big in that dimension.

Spec Sheets: Specification sheets, showing garment measurements, by dimension, for each size of a garment.

Usable Ease: If Excess Ease is positive, then some, but not all, of this Excess Ease can be used for fitting purposes, and the garment can still fit well. The amount of Excess Ease that can be used for fitting purposes is the Usable Ease.

III. Curve Development

Specification sheet information is acquired, including the sample size, fit model measurements, and Fabric Factors. Additionally, the personal preference factors for the individual being fit are collected.

For each dimension, the Intended Ease for the sample size is determined by subtracting the Fit Model measurement at that dimension from the Sample Size measurement at that dimension, then expressing it as a percentage of the Fit Model measurement. From this, the Intended Body Measurements for that dimension for each size of the garment are determined, based on the percentage of Intended Ease, not on absolute amount of ease. Fabric Factors are applied to obtain the Adjusted Garment Dimensions. Excess Ease, the amount by which the Garment Dimension exceeds the sum of the Intended Body Measurement and the Minimum Ease, and Adjusted Excess Ease, the amount by which the Adjusted Garment Dimension exceeds the sum of the Intended Body Measurement and the Minimum Ease, are determined.

Determining the Intended Body Measurements for that dimension for each size of the garment based on the percentage of Intended Ease is also a key concept, in that the industry standard is to assume constant intended ease throughout a size grade. This may be further tuned, in that the expression as a percentage may be an approximation for something else, such as relating ease to the square of the radius of the body dimension, since C=pi*D, indicating that increase in circumference is linearly related to increase in diameter. However, empirical evidence shows that this does not work. Imagine 2" of ease in the chest of a garment on a size 10 woman, on a mouse, and on an elephant. The garment is fitted on the woman, huge on the mouse, and unwearably tight on the elephant. Although circumference is linearly related to diameter, relative circumference is not what really matters for determining a comfortable amount of ease in a garment. Area increases by radius squared, and the area of a cross-section of the body at a dimension that dictates the required amount of ease in that dimension. For example, in the context of the chest, part of the ease is necessary for chest expansion, which is dependent on lung size.

For each Primary Dimension, in one embodiment, (see FIG. 1 and FIG. 2), the Perfect Linear Segment is bounded by IBM+($G_{1_-}$*Grade), for Inflection Point D, and IBM−($G_{1_+}$*Grade), for Inflection Point E. If the Curve is being established for a size with different Grades up and down, the Grade used in these two equations is not equal. If ($E_{1_-}$*Adjusted Excess Ease) exceeds ($G_{1_-}$*Grade), then an optional Inflection Point, C, is created at IBM+($E_{1_-}$*Adjusted Excess Ease), creating the Just Under Perfect Linear Segment. If ($E_{1_+}$*Excess Ease) exceeds ($G_{1_+}$*Grade), than an optional Inflection Point, F, is created at IBM−($E_{1_+}$* Excess Ease), creating the Just Over Perfect Linear Segment. The next Inflection Points are created by IBM+(the greater of ($E_{2_-}$*Adjusted Excess Ease) and ($G_{2_-}$*Grade)), for Inflection Point B, and IBM−(the greater of ($E_{2_+}$*Excess Ease) and ($G_{2_+}$*Grade)), for Inflection Point G, creating the Small but Wearable and Loose but Wearable Linear Segments. From there, on the left side of the Curve, slope is increased such that it reaches 0 at IBM+(the greater of ($E_{3_-}$*Adjusted Excess Ease) and ($G_{3_-}$*Grade)), creating Inflection Point A and the Small but Marginally Wearable Linear Segment; on the right side of the Curve, slope continues such that it reaches 0.05 at IBM−(the greater of ($E_{3_+}$*Excess Ease) and ($G_{3_+}$*Grade)), creating Inflection Point H and the Loose but Marginally Wearable Linear Segment. From there, on the right side of the Curve, the slope flattens to 0 and the Dimensional Fit Rating remains a constant 0.05 to positive infinity, creating the Unwearably Loose Linear Segment. Curves or indicia thereof, are stored in the database. There is a sense in which "Unwearably Loose" is a misnomer. Unlike "Unwearably Small", an "Unwearably Loose" garment can still be used to cover the body, even though the look is not as intended. Accordingly, the fit rating never falls completely to 0, but is low enough to indicate that the garment does not fit as it was intended. The primary dimension curve in FIG. 1 can also be developed without incorporating optional Inflection Points.

Figure 2:
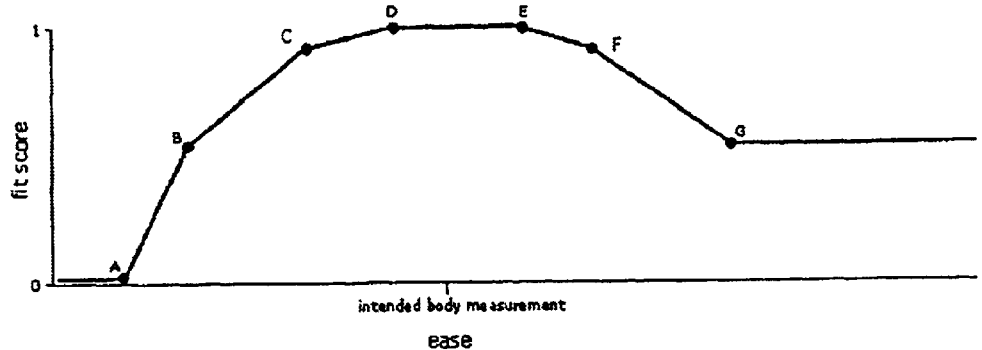
FIG. 2 is a fit curve to obtain a fit score based upon ease for a Secondary Dimension.
Figure 2A:
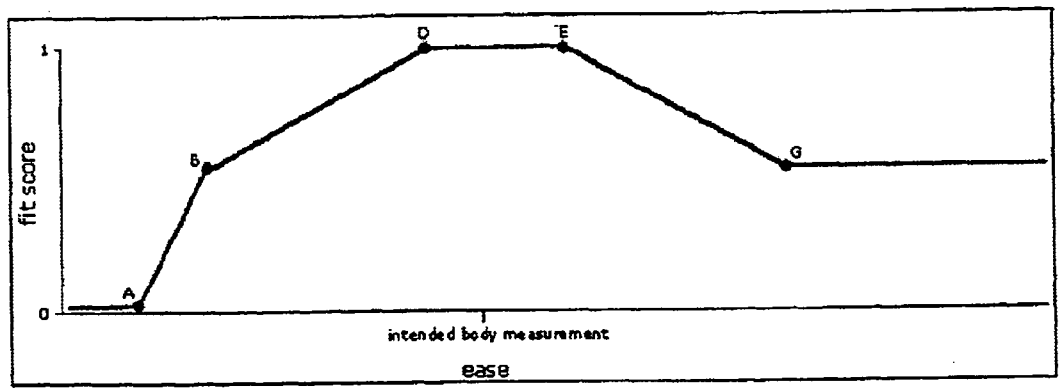
FIG. 2A is a fit curve to obtain a fit score based upon ease for a Secondary Dimension without inflection points C and F.

For each Secondary Dimension, as shown in FIGS. 2 and 2A, the lower bound of the Perfect Linear Segment is IBM+(the greater of ($E_{1_-}$*Adjusted Excess Ease) and ($B_{1_-}$*IBM)), for Inflection Point D; the upper bound of the Perfect Linear Segment is IBM−(the greater of ($E_{1_+}$*Excess Ease) and ($B_{1_+}$*IBM)), for Inflection Point E. The next Inflection Point is at IBM+(the greater of ($E_{2_-}$*Adjusted Excess Ease) and ($B_{2_-}$*IBM)), creating Inflection Point B and the Small but Wearable Linear Segment; and IBM−(the greater of ($E_{2_+}$*Excess Ease) and ($B_{2_+}$*IBM)), creating Inflection Point G and the Loose but Wearable Linear Segment. From there, on the left side of the Curve, slope is increased such that it reaches 0 at IBM+(the greater of ($E_{3_-}$*Adjusted Excess Ease) and ($B_{3_-}$*IBM)), creating Inflection Point A and the Small but Marginally Wearable Linear Segment. On the right side of the Curve, slope flattens to 0 and the Dimensional Fit Rating remains a constant 0.5 to positive infinity, creating the Loose but Marginally Wearable Linear Segment. Alternatively, for computational or other reasons, the construction of the "tight" half of the curve may be substituted with the corresponding construction of the curve for the Primary Dimensions, as described above. Curves or indicia thereof, are stored in the database.

In an alternative embodiment, if, for example, the ratings are determined from −1 to +1, the curve is not a bell, but a half-bell pasted to an inverted half-bell. In other words, half of the curve is a mirror-image.

IV. Fabric Factors and Personal Preference Factors

The above methodology is used to create Curves applicable to garments. When a consumer wants to find out what garment fits them best, a set of the consumer's body dimensions is compared to the Curves to determine Dimensional Fit Ratings. Dimensional Fit Ratings are then combined to form Garment Fit Ratings.

Determining Dimensional Fit Ratings

Dimensional Fit Ratings are determined for each Fitting Dimension and each size of garment being tested. For a particular size in a particular dimension, the Dimensional Fit Rating is determined by comparing the consumer's body measurement in that dimension to the Curve for that size and that dimension in that garment. The consumer's body measurement is matched up to body measurement along the x-axis, and the Dimensional Fit Rating is the y-intercept of the Curve at the body measurement point identified along the x-axis. Explained another way, the consumer's actually body measurements are compared to the permissible body measurements for each size (in a preferred embodiment, for the body measurements that produce non-zero Dimensional Fit Ratings), as determined by the applicable Curve. In another embodiment, additional nuances to the Dimensional Fit ratings can be implemented to integrate a consumer's stated and/or observed "fit preferences" . . . a consumer might prefer a garment to be looser or tighter. These preferences are integrated by applying linear or nonlinear scaling factors to the ease.

A table is created of Dimensional Fit Ratings for each garment size being considered. For example, in a particular embodiment, for a pair of woman's pants, the table might look something like FIG. 3.

a. Determining Garment Fit Ratings

Garment Fit Ratings are determined by combining all Dimensional Fit Ratings for a particular size garment. The Dimensional Fit Ratings are multiplied together to create the Garment Fit Rating. In another embodiment, Dimensional Fit Ratings can be exponentially modifying, in effect creating a non-linear Curve, to increase or decrease the importance of certain dimensions.

In alternative embodiments, in addition to weighting the relative importance of each dimension, further modifications to the formula can be applied. One modification compensates for the colinearity of measurements; this is particularly useful where data is missing for one or more desired dimensions; in such a case, if two correlated dimensions are both present, the results of each would have approximately the same impact as if a single measurement where the other measurement were missing. Another modification normalizes the result to adjust for the different numbers of dimensions that are scored for a particular garment so that, for example, a garment with 3 scored dimensions achieves a comparable score to that of a garment with 7 scored dimensions. Yet another modification would adjust the score for having all of the results on the "tight" or the "loose" side. Another modification would adjust the score to penalize the result for missing measurements on the individual or the garment.

One variation is that missing body dimensions can be considered to have a constant fit score. The constant fit score is 1 for non-critical (and secondary) dimensions (e.g. calf circumference for pants), and a lesser value (e.g. .9) for critical dimensions. Missing critical dimensions are flagged for the presentation.

In another embodiment, Garment Fit Ratings can be determined based on grouping of Dimensional Fit Ratings. For example, if all Dimensional Fit Ratings are greater than or equal to the fit score assigned to Inflection Points C and F (i.e., 0.95), fit could be described as the maximum point 5-star. If Dimensional Fit Ratings for all critical dimensions are all greater than or equal to fit score assigned to Inflection Points C and F (i.e., 0.95) and Dimensional Fit Ratings for all non-critical dimensions are all greater than or equal to a fit score somewhere between the fit score assigned to Inflection Points B and G and the fit score assigned to Inflection Points C and F (i.e., 0.7), fit would be 4-star. If Dimensional Fit Ratings for all critical dimensions are all greater than or equal to interim fit score determined above (i.e., 0.7), and Dimensional Fit Ratings for all non-critical dimensions are all greater than or equal to the fit score assigned to Inflection Points B and G (i.e., 0.5), then fit would be 3-star. If Dimensional Fit Ratings for all critical dimensions are all greater than or equal to the fit score assigned to Inflection Points B and G (i.e., 0.5), and Dimensional Fit Ratings for all non-critical dimensions are all greater than or equal to the fit score assigned to Inflection Point H, then fit would be 2-star. If any Dimensional Fit Rating is less than or equal to the fit score assigned to Inflection Point H, then fit would be 1-star.

If the consumer's set of body measurements is incomplete, the system will predict fit based on the available data. If there are Required Fitting Dimensions for which measurements are not provided, the system may return an error, indicating that that garment cannot be fitted without providing, at a minimum, measurements for each Required Fitting Dimension. Otherwise, if measurements are provided for all Required Fitting Dimensions, a prediction will be made based on the information provided. In this case, the system may return a warning that no measurement for that dimension was provided to the system, and the score might be penalized to adjust for the missing data.

b. Presentation of Garment Fit Ratings

Garment Fit Ratings are converted into a star rating or other easily identified system. If a Garment Fit Rating of, for example, 0 is returned the garment is unwearable, and no stars would be returned. For non-0 Garment Fit Ratings, some number of stars would be assigned.

The following recommendations can be used for presenting fit results:
1. If only one size scores, that size is recommended.
2. If 2 or more sizes score, the highest-rated garment is recommended, but consumer may be presented the scoring details as well as the scores for other sizes.
3. If a person is within a size range, but no size scores above the minimum threshold, the consumer may be presented the scoring details and see why the various sizes were predicted not to fit.
4. If person is smaller than the smallest size in the range, the smallest garment can be shown to consumer if he or she wants to view it.
5. If person is larger than size range, give an "I'm sorry" response, or show the largest size and indicate which dimension(s) are unwearably tight.
6. Never show a garment that has measurements falling in the Unwearably Loose Linear Segment if there is a smaller size of that garment for which no dimension is tighter than perfect.

When presenting the fit details, the ease of each dimension is again considered. For qualitative feedback, the dimensions are then ranked and prioritized depending on the importance of the each information. An example of a ranking system starting with maximal importance follows: missing critical body dimension; critical ease small-but-wearable; critical ease large-but-wearable; non-critical ease small-but-wearable; non-critical ease large-but-wearable. The information is then converted to pseudo-random English sentences that qualitatively present the results, e.g. "The waist is snug." or "Tight around waist." If all dimensions have a perfect fit score, then a sentence to this effect is displayed.

Personal preferences affect fit in multiple ways. Individuals do not always wear garments the way the designer intends them to fit. Some prefer to wear their garments tighter or looser than intended. Personal Preference Factors are a function of the individual's choosing. This choice may be consistent, or may depend on the application of a garment. For example, a man may want a loose-fitting T-shirt when doing manual labor, but the same man may want to wear a very tight-fitting T-shirt when going out to a bar, or one that fits somewhere in-between when jogging. other preferences stretch or reduce, raise or lower specific aspects of a garment; for example, a woman might prefer to wear trousers lower or higher than they are intended to be worn by the designer. A personal preference factor is derived from direct querying of the individual in a general sense, from querying at the time a fit prediction is being rendered, or through observation or interpretation of past sizes selected. It can be further refined through a feedback loop. Personal preference factors can be general to all parts of a body, or localized to individual dimensions or regions.

V. Classification

The selection and classification of the dimensions used to determine optimal fit prediction is an important step. This process has been optimized to use an object-oriented apparel classification hierarchy.

A tree structure is used to classify the apparel classes, not unlike a kingdom-phylum-class-family- . . . classification used in biology. Each node in the tree corresponds to a garment classification, and the further one traverses down the tree, the more detailed the description gets.

Figure 4:
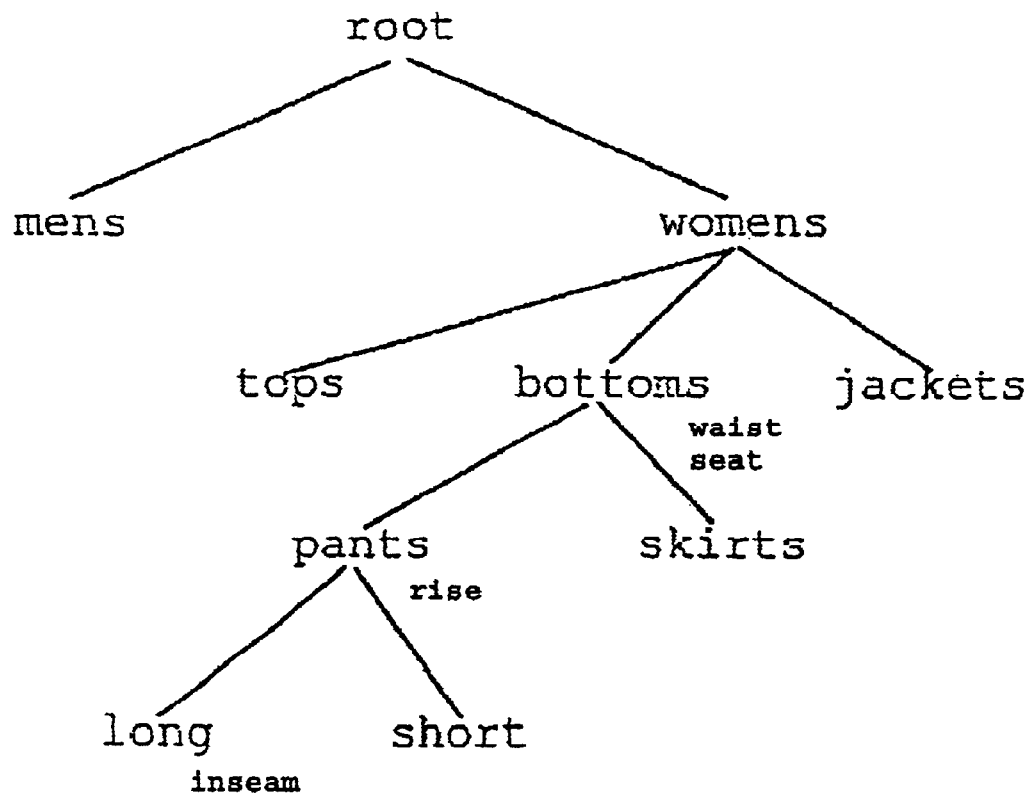
FIG. 4 is an apparel classification tree

For example, imagine a tree with two top-level nodes, labeled "men's" and "women's." Under "women's" there are three nodes, these labeled "bottoms", "tops", and "jackets." Attached to the "women's:bottoms" node are the dimensions generally used for fit prediction for women's bottom garments: waist and seat. There are more detailed sub-nodes labeled "pants", "shorts", and "skirts." The node "women's:bottoms:pants" has attached the rise dimension. This example can be seen in the graph in FIG. 4.

If a garment is classified as "women's:bottoms:pants:long", then a traversal up the tree to the root node will produce a list of the following dimensions: inseam, rise, seat, waist. These are therefore the dimensions used in fit prediction.

Extensions are made to label the dimension as primary or secondary, required or recommended, and also to indicate whether to add or remove this dimension as a factor during fit prediction. Of course overrides can be made at the garment level for garments that are not easily classified in the general apparel class hierarchy.

Rules are created to indicate how dimensions can be combined to form other dimensions. For example, the arm length body dimension is calculated by measuring from center-back to over-the-shoulder to the wrist. If a long-sleeve shirt on has recorded measurements of cross-shoulder and shoulder-to-wrist, then a rule can be created that equates the center-back-to-wrist measurement to ½ the cross-shoulder measurement plus the shoulder-to-wrist measurement.

Another extension is to be able to modify the constants associated with fit prediction based on apparel classification and/or individual garment.

This optimization is helpful for the rapid classification, testing, and entry of new garments.

VI. Fabric Factors and Personal Preference Factors a. Fabric Factors

Fit of garments is impacted by characteristics of the fabric. These range from a quilted parka, which is unwearably tight when it is several inches bigger than the body, to a form-fitting spandex tube top which is too big even though it is the same size at the body.

Application of Fabric Factors is fully integrated into the system and method, embodied by the distinction between Garment Dimensions and Adjusted Garment Dimensions and between Excess Ease and Adjusted Excess Ease: Adjusted Garment Dimension=FF*Garment Dimension and Adjusted Excess Ease=Adjusted Garment Dimension−Minimum Ease (or Adjusted Excess Ease=(Adjusted Garment Dimension−Garment Dimension)+Excess Ease).

Fabric Factors are a function of fiber content, fabric weight, yarn construction, hand, and stitch/weave. For example, a 100% cotton garment, such as used in khakis, might be a 10 oz. 3×2 left hand twill. Take the exact same fabric, but replace 5% of the cotton with spandex, using the spandex as the core for the fill yarns, and you produce a fabric with horizontal stretch. If the spandex was instead used as the core for the warp yarns, you produce a fabric with vertical stretch. When you do have a fabric that stretches, some, but not all, of the stretch can be utilized for fitting purposes.

b. Personal Preference Factors

Assuming the individual has indicated that she prefers to wear the garment as intended (or the preference is unknown), we would apply a Personal Preference Factor of 1.0. If the individual indicated a preference for moderately-tighter tops, we would apply a multiplicative Personal Preference Factor of 0.9; alternately, an additive Personal Preference Factor of −½" could be applied. The various adjustment factors (including Fabric and Personal Preference Factors) could be independent, or could be interrelated through a multivariate application.

VII. Example

An embodiment of the invention is described in the following example. However, modifications to the given example would be apparent to those skilled in the art.

In the present example, a given a garment bust measurement for Sample Size is 44"; a Fit Model Bust Measurement is 36"; with a Grade (up and down) in the bust as 2.0" from the Sample Size; and the fabric is a lightweight sweater knit with 80% stretch.

Minimum Ease: 5% (Minimum Ease percentage)*36" (IBM)=1.8" Minimum Ease.

Excess Ease: 44" (Garment Dimension)−36" (Intended Body Measurement)−1.8" (Minimum Ease)=6.2" Excess Ease Fabric Factor: For a lightweight sweater knit, 20% of the stretch is usable for fitting. Accordingly, 0.8 (stretch)*0.2 (stretch usable for fitting)=0.16 additional fabric available for fitting. 1 (existing garment)+0.16 (additional fabric)= 1.16 times more fabric usable for fitting, or a Fabric Factor of 1.16.

Adjusted Excess Ease: 6.2" (Excess Ease)*1.16 (Fabric Factor) 1.0 (Personal Preference Factor)=7.19" Adjusted Excess Ease.

Inflection Point D: 36" (IBM)+(0.5 ($G_{1-}$)*2.0" (Grade))= 37".

Inflection Point E: 36" (IBM)−(0.5 ($G_{1+}$)*2.0" (Grade))= 35".

Inflection Point C: (0.4 ($E_{1+}$)*7.19" (Adjusted Excess Ease)) is greater than (0.5 ($G_{1-}$)*2.0" (Grade)), so Inflection Point C is created at 36" (IBM)+(0.4 ($E_{1-}$)*7.19" (Adjusted Excess Ease))=38.88".

Inflection Point F: (Since Excess Ease is less than Adjusted Excess Ease, Excess Ease is used to establish Inflection Point F) (0.4 ($E_{1+}$)*6.2" (Excess Ease)) is less than (0.5 ($G_{1+}$)*2.0" (Grade)), so Inflection Point F is created at 36" (IBM)−(0.4 ($E_{1+}$)*6.2" (Excess Ease))=33.52".

The determination of Inflection Points B, G, A and H is done in the same manner and would be apparent to one skilled in the art.

The above shows us that, for that sweater with a 44" bust measurement and 80% stretch, a person can have a body bust measurement of between 33.5" and 38.9" and have that garment still have an excellent fit in the bust, with a look similar to what was intended. However, the perfect score is only given for body bust measurements of between 35" and 37", since there is another size garment just a 2" Grade away. The narrowness of the "perfect" range (D to E) is important, in that a consumer may not be told that multiple garments are a good fit. The broadness of the C to F range is important for consumers with atypical body shapes, in that they can be properly instructed as to which garment, none of which were designed to fit their actual body, will fit their actual body the best.

In one embodiment, the system of determining the fit of a garment on a customer may include, but is not limited to, a customer having a personal computer, web accessible telephone, PDA or the like to input and output garment selection related information. This input/output device may be connected to the Internet or other public access network via a communications device such as a modem, wireless web connection, cable access or the like. The customer, who would request a fit prediction, would access a website, which would accept, evaluate, provide and maintain information for determining the fit of a garment on the accessing customer or other customers. A customer may have access to information she provided regarding her body dimensions; preferences are password protected or restricted by use of a personal identification number (PIN) so that others may not access it without her consent. A garment provider may either provide garments directly to customers, retailers or distributors, may also access, by the same or similar means, the website for purposes of accessing customer fit prediction requests.

In one embodiment, a database can store and provide fit scores which relate to possible body dimension measurement as either taken by a customer, recorded by an electronic tape measure, scanned by a three-dimensional body scanning booth or derived from any other methodology including other input devices and/or past purchase history data. The database may be stored on a computer, or other data storage device in the art, for use by a particular clothing establishment, or be stored in such a manner that the database information is available for access by a customer over the Internet or other public access network. Once body dimensions are received, the system can determine a fit score for a particular dimension of a garment for a user by employing the method described above. This first database can store a single garment dimension or a plurality of garment dimensions for a single garment or a plurality of garments.

The system may also include, but is not limited to, a second database wherein customer purchase selections can be stored. The purchase selection can be used to create a profile of customer selections in order to facilitate future purchases. Customers can also provide style preferences, which would be stored in the second database to facilitate future garment selections. In addition, customers can store purchase and other related information for use with the present invention. Customers may also provide garment preferences so that the system may determine which garments a customer may want to choose from to determine fit scores. One method for collection of such style preferences is through the use of survey questions. Another method is through data collection of prior garment purchases or traffic pattern on a website, which establish interest in different types of garments.

Once a fit score is determined, the customer can be provided with this score for an individual garment dimension, an entire garment, a range of sizes, or a range of different garments. For example, if a customer provides only one body dimension, a fit score for only one garment dimension may be provided. If a customer provides more than one body dimension, the fit scores for each dimension can be multiplied together to obtain an overall fit score. The fit score can, if desired, be related as a star rating to facilitate customer appreciation of the fit of the particular garment on that customer.

The fit score or star rating can then be stored in a database so that such customer information can be later used to select different garments. This database can operate as a "personal shopper" in that it maintains information regarding a customer's size, fit, personal style preferences and purchase history. Such information can be used to assist the customer in future garment selections whether during an online purchase or at a bricks and mortar retailer. Customers may provide additional information by completing a questionnaire either on-line, at a scanning booth, by mailing in a hand completed form or over the telephone. Information such as personal style preferences is input by the customer in order to improve proposed garment selections by the personal shopper. Data regarding individual garments is provided by garment retailers, manufacturers and brands.

A description of the method and system components utilized in conjunction with the size and fit method follows:

First, a three-dimensional scan is taken. If no scanner is available, or a customer does not desire to have his or her body scanned, body dimension measurements can be input into a computer or other data entry device. Such dimensions may be taken using a conventional tape measure or an electronic tape measure or other measuring device known in the art. Deductive reasoning can be employed by the system using data points that are provided, such as waist and bust measurements. This deduction can be based on statistical analysis of other bodies in the database, including those collected via body scanning. Alternately, the body measurements can be deduced statistically from qualitative and/or quantitative data collected about the consumer. This data can include body weight data, age, shoe size and other factors. It can include the style, brand and/or size of garments that fit an individual, or that the individual has purchased in the past. Usage of one or more of these systems will more accurately assess the customer's complete body dimensions.

Customers can update their body measurement in several ways. A customer whose body measurements have changed can answer a few questions to help recalibrate the size data. The quality of subsequent size and fit predictions will be at least as good as traditional off-line measurements, but can be enhanced through data mining a vast database of body sizes and past purchase and past browsing behavior. Customers can re-scan or re-measure their bodies. The expectation is that, generally, customers may need to update their body measurements about once a year.

Customers may be provided with an identification card and personal identification number (PIN) or password so as to access data, such as style preference, body dimension and purchasing data. The identification card may be swiped at a bricks and mortar store using the system and method of the present inventions, so that customer purchase selections or garment preferences may be loaded into the system. The customer identifier may be used to facilitate an on-line purchase or a catalog purchase. In addition, information from the customer's profile may be downloaded so that a personal shopper can assist the customer in selecting garments. Further, a PIN and other security mechanisms may be used to provide additional security to the customer so that others may not access personal information without permission. A PIN or password may also be used in connection with a customer user name if no identification card is being used. For example, if a customer logs onto a personal computer outside of a bricks and mortar store, the customer would enter his or her user name and PIN or password to access his or her account information, such a style preferences and purchase history.

The identification card can also be used like a credit or debit card. The card can be associated with a particular retailer, brand, or be used to in connection with loyalty programs. Alternately, the customer information can be attached to a credit card, a debit card, a customer loyalty or membership card, or any other identifier.

Apparel provider websites would also have access to customer data for use in providing appropriate garment selections in response to a customer's request. A personal shopper can use customer preferences and body-dimension information and determine appropriate garments using the method described above to select appropriate garments for customers. Similarly, the customer can use the personal shopper when accessing the system in a bricks and mortar store. Such bricks and mortar retailers may have kiosks or personal computers from customers will utilize the system, or employ hand-held technologies to allow consumers to find the best size in a given garment. Alternately, point-ofsale systems, customer relationship management or other clienteling systems can be enabled with the results of size and fit predictions.

In selecting appropriate garments, a personal shopper can, using a software application, analyze the customer's body dimensions in light of preferred garments sizes, styles, fabric factors, grade, garment ease, customer purchase history and other available information. This prediction may be encapsulated and accessed from third-party websites, from off-line stores and on a main website. The main website aggregates the size and preference acquisitions, presents the personal shopper to the customer and becomes the "apparel portal" on the Internet or other public access network. An additional function of the main website is to provide a "virtual dressing room" where customers can "try on" selected garments on her digitized shape. The personal shopper selects and provides garments to the customer to "try on" based upon an analysis using the above-described method.

Once a customer selects a garment for purchase, the customer is directed to the appropriate website or brick and mortar retailer to purchase the garment. The customer may be directed by way of a search engine. In another embodiment of the present invention, the main website accepts the order on behalf of the on-line retailer, as well as the off-line retailer. After a transaction or referral, the main website or system may send the customer a customer satisfaction survey. Based on feedback from the survey, which is inputted into the database, the customer's future recommendations can be improved. In addition, at an aggregate level, retailers, brands and manufacturers can use this same information to improve their service and their products by providing garments that more accurately reflect the customer's needs.

The database contains data about the customer which may include, but is not limited to, the following: customer's identity; the customer's size, whether scanned or measured in another surrogate form; fit preferences (for example, loose or snug); style preferences history or purchases and returns; financial details (similar to an e-wallet to facilitate transactions); post-purchase feedback and other information that may be relevant to garment selection and purchases. The customer can select which of these data elements are collected, can make the data anonymous, can protect the data with a PIN code. The consumer can grant access selectively or to everyone, and to keep certain elements confidential.

Figure 5:
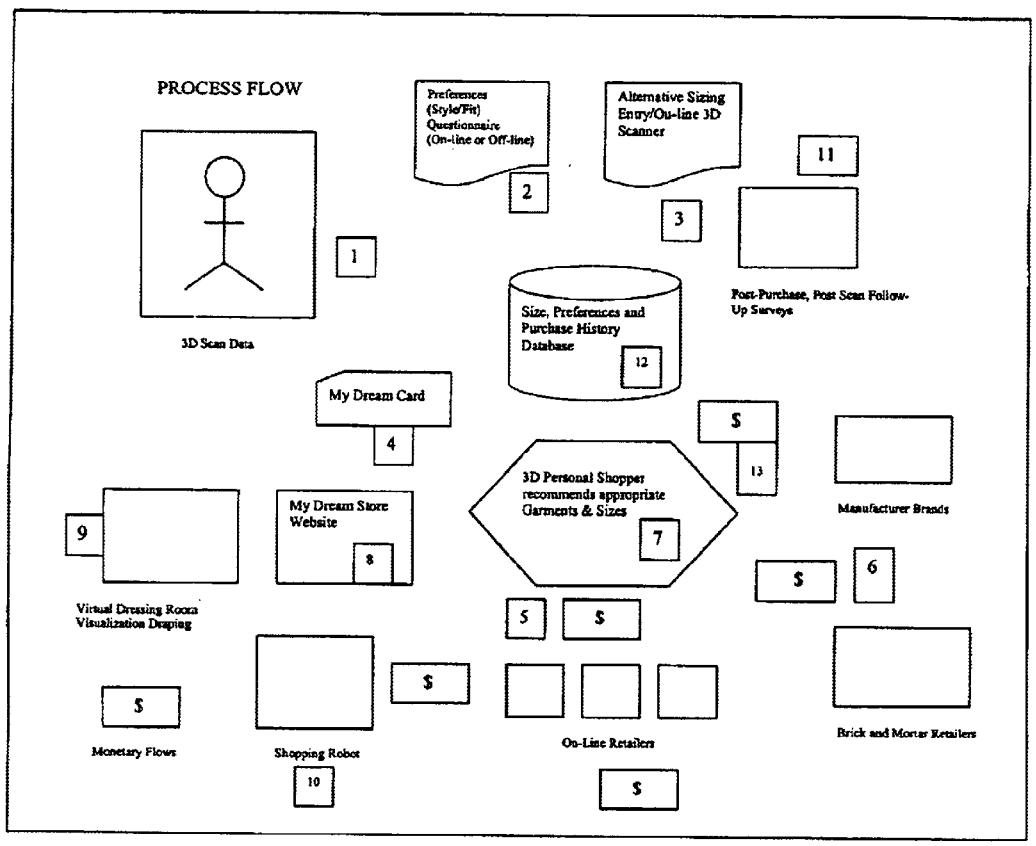
FIG. 5 is a process flow diagram of the system.

Following is a description of how the above components interact with the customer, on-line retailers, off-line retailers and brands. Reference to FIG. 5 should be made in this regard.

Customer Interaction with the Main Website

The customer interacts with the system in many ways. For example, the customer enters a body scanner and is digitized. The scan is processed and stored in the database. The customer also interacts with the system by completing a preference questionnaire, which assesses style and fit parameters as part of the scanning or body measurement data collection process. These responses are also stored in the database. The customer can provide sizing details on-line by one or more of the following: entering the brand and size of garment which fit; entering one's known measurements; printing out a form and having a tailor or other individual take measurement which are then entered into the database; self-measurement; using an electronic tape measure or hand-held scanning device to assist with self-measurement; self-measurement using a tape measure; or other measuring device. These measurements are processed in the system and a reduced-precision size model of the customer is created and stored in the database.

In addition, the customer may receive a personal ID number, which may be anonymous or unlisted. This ID number may take the form of a physical card like an ATM card. The card may then have a PIN or password attached to it for access to the central database containing the customer's information. The card or ID number can be provided to on-line retailers and bricks and mortar retailers to access the customer information from the database and the personal shopper. Customers may also access the main system website to receive advise about the size, make and style of garments to purchase and to interact with the virtual dressing room and the personal shopper to aid in the garment selection process.

Once the customer selects a garment, the customer can be directed to an appropriate retailer either on-line or off-line. If the customer is connected to the system on-line, the customer can be directed via a search engine connected to the main website. The appropriate retailer can then transact a sale with the customer. Or in another embodiment, the main website can then transact the sale on behalf of the retailer.

After a sale or activity on the main website, the customer is provided with a post-sale or post-activity customer satisfaction survey to help tune or improve the database and the customer's profile. The customer can choose to complete this survey, if desired.

Customers can selectively log actual purchases, both on-line and off-line, in the central database. This can be accomplished on a "opt-in" basis where the customer allows the main website to track all purchases, or the customer allows for tracking on a case-by-case basis. In addition, a customer can select clothing to be entered into a "gift registry", which can be made available to friends and family or other individuals other than the customer. This information can be inputted at the main website and stored in the database and can be accessible via the personal shopper. The registry could be made fully open, accessible only to selected individuals. The size details could be kept confidential, thus allowing someone to but a garment in the right size without ever knowing the true size of the recipient. Further, the main website can provide a "gift reminder" service, which reminds the customer of upcoming events such as birthdays, anniversaries, and holidays. This could be combined with accessing the giftee's personal profile and a personal shopper to help select an appropriate and fitting gift.

The customer can also use this system to design or specify "made to measure" and fully customized clothes on-line. By knowing the size and style preferences, the customization process can be dramatically simplified. The customer can create customized clothes on the main website, on an on-line retailer's site or in a bricks and mortar retailer, at, for example, a kiosk.

On-Line Retailer Interaction with the Main Website

On-Line retailers may interact with the system and process in the following manner. For example, when a customer enters an identification card and/or PIN, an on-line retailer is provided access to the database and the personal shopper. By encapsulating the personal shopper application and extending it to the on-line retailer's site, this will provide a degree of consistency, assurance and security of size and fit, much as what Verisign and other services provide for on-line security, or Good Housekeeping does for consumer packaged goods.

The results of the size and fit predictions can also be delivered on the retailer's site through a "size tag" which would display the recommended size, the fit rating, and associated details. A consumer could interact with the size tags to see additional information, to assess other sizes or styles, to update his or her profile, to provide feedback, and to otherwise interact with the system.

In addition, the main website can drive traffic to the on-line retailer via the system search engine. Also, the main website can provide additional tools to help in selecting and "trying on" garments. This includes the "virtual dressing room" on the main website where customers can try on garments on their digitized silhouette, then selected and the sale transacted on the on-line retailer's website. In another embodiment, additional services may include, but is not limited to, a universal shopping cart to facilitate transactions.

Further, the results of the post-transaction or post-activity customer satisfaction surveys can be made available to the retailer, which provides market research information to the retailer and enables for product and process improvements.

Off-Line Retailer Interaction with the Main Website

Off-line retailers interact with the main website and system in several ways. For example, off-line retailers can have access to customer database information and the personal shopper through access to customer card and PIN information. This information can be provided to an in-store sales assistant or via a wireless PDA device or other mode of communication. Alternatively, this information can be accessed via self-service kiosks, through point-of-sales terminals or through credit-card authorizing systems.

In addition, the retailer's inventory database can be linked to the personal shopper, allowing a customer or a salesperson to find the most appropriate garments in less time. Further, the personal shopper can scan the retailer's inventory database and allow the customer to select various garments which could be delivered to the customer's home or selected and waiting in a store to be tried on.

Brand and Manufacturer Interaction with the Main Website

Brands and manufacturers also interact with the main website. For example, they can have access to the measurement database, through data mining techniques, in order to determine the range of sizes and body shapes comprising their clientele. By data mining the personal preferences and purchase history or customers and non-customers, the brand can determine what relationships to strike, and what lifestyle data to leverage in its advertising and marketing. Brands and manufacturers also have access to post-purchase and post-activity customer surveys. In addition, brands and manufacturers can sell directly to customers without the use of a retailer.

Measurement Acquisition

Two approaches exist to measurement acquisition: virtual and physical. The physical measurements can be three-dimensional body scans or tape measurements. The virtual measurements are various approaches to collecting this data. Measurements about a consumer could be collected via either or both approaches. Within each approach, one or more data collection techniques can be employed.

Virtual Measurement Acquisition

For people who are unable or unwilling to visit a scanning booth, or for people whose sizes have changed, a hierarchy of measurement acquisition approaches can be used. These are collected on the main website and integrated into a virtual scanner or measuring system. First, deductive reasoning and other statistical techniques can be used by asking the customer for size and manufacturers of existing garments that fit and employing size equalization techniques known in the art. Further information can be obtained by presenting standard body type shapes and selecting the closest generic body type, or by asking questions in a qualitative form such as "is your waist larger than your hips?" Over time, as the databases of body shapes and garment sizes grow, the inferences become more and more predictive. Second, the customer can be provided with self-measurement instructions, informing the user, a friend or third party, how to take body measurements, along with diagrams and potential measurement templates, which are printed out. Third, the customer can be provided with specially designed system tape measures, which can be mailed to the customer or distributed at bricks and mortar locations. Fourth, customers can go to a tailor or other trained party who takes the measurements using a standard form with standardized definitions. Fifth, the customer can use an electronic tape measure that facilitates self-measurements. The electronic tape measure can be connected to a mouse-port, for example, on a PC and a customer or friend could measure key dimensions of the body.

Physical Scanning

Body scanning can be conducted using various technologies such as white light, infrared light, lasers or digital photography. These technologies are well known in the art. Three-dimensional scans provide far more data than a series of linear measurements collected using tape measures or other virtual techniques.

The scanning process includes, but is not limited to, a customer entering a scanning booth wearing snug clothes, a form-fitting scanning suit or, the clothing he or she happens to be wearing (the fully-clothed method); using white light, infrared light or lasers, to scan and digitize the entire body; converting the scanned body image into a digital cloud; the cloud is then converted into a three-dimensional simulation of the customer's body; the simulation or avatar is then measured with a high degree of certainty (usually, 1 cm or less); and then the series of measurements is extracted from the cloud and fed into various application. For instance, these measurements can be used for the size and fit prediction technique described above. In addition, these measurements are used in the virtual dressing room where customers virtually try on garments, or for made to measure clothing definitions. Further, this type of measurement can be used for a variety of non-apparel related applications such a cosmetics, hairstyles, health and diet, creating three-dimensional interactive icons for video games and chat applications, selection of sporting goods and home products or any other purchase or application that requires or desired body measurements for an improved selection.

The above-mentioned scanning suit may also be a disposable scanning suit, suitable for single use only. Alternatively, the scanning suit may be reusable, but sanitizable. When employing the fully-clothed method a scanning suit may not be necessary.

As described above, customer preference information is stored in a database for use in selecting appropriate garments. This preference information is gathered in various ways. Some of this data is provided directly by the customer, other data is collected via observation. First, a preference questionnaire is administered to customers both on-line and off-line. Off-line administration can include, but is not limited to, via Internet or public access network terminals that are part of the kiosk architecture. The questionnaire includes, for example, questions about style, color, favorite designers, fit preferences and tastes. Additional data can be collected about friends and family for future gift purchases by the customer. A customer can opt in to a purchase history database that allows tracking and feedback of past purchases. Each individual's measurements are cross-referenced with a massive, proprietary database of the measurement of each brand broken out by sizes and styles and though collaborative filtering to the database of other people's measurements. The customer can also provide other information, such as whether a purchase is a gift and should therefore, not be entered into the customer's personal profile. Further, the customer has full control over what data to maintain as confidential.

Other customer information can be provided to the system from the personal shopper, which is the personified embodiment of the knowledge base. This includes, but is not limited to, a combination of: a rule-base, or expert system about styles, sizes, designers and websites; the customer's size and preference data; a database of manufacturers, brands, styles and sizes; and a database of websites and on-line retailers understanding who sell which products.

This software application is the interface to the customer in order to find or specify garments that fit and get recommendations about garments. It may reside on the main website, and also in various forms on other websites, in catalog processing centers and in bricks and mortar locations.

The database and personal shopper can be linked to a sophisticated search engine, which lists the site(s) where the garments can be purchased. Once a customer has selected a garment, the search engine scours the database and the web to find retailers who sell the appropriate size and style of the garment. The search engine receives replies, which are presented to the consumer in a variety of ways; for example, by price, delivery time, in-stock status, geographic region, customer satisfaction rating of the sites, or other categories that are known in the art. Customers who want the product at the least expensive price may select a different vendor than those who want to buy the product from a retailer where customer satisfaction ratings are the highest, for example. The customer can click through or link to the other site to place an order. This click trough can also contain an e-wallet with accompanying customer information to streamline the transaction process. Additionally, use of a universal shopping cart can reduce the transaction steps to clicking a mere "buy it", or other, icon on a particular vendor's icon and the transaction is consummated on the mail website. This search engine can also be utilized to access off-line retailers inventory.

Use of this database system is not limited to the apparel industry. In addition to sporting goods, health, entertainment and chat applications, the database can be used by data aggregators such as, supermarket scanner firms, coupon-generating or direct marketing firms, or other firms who make POS displays or in-retail store technology kiosks. Financial services providers can also utilize this system, for instance, ATM networks, credit card or debit card companies. Additionally, industrial designers and mechanical designers could also use this type of system and method when body scanned and other measurement information may provide beneficial information for other designs, such as a car seat or home appliances. Modifications to the described invention may be necessary to tailor the system to specific applications. However, such modifications would be obvious to one of ordinary skill in the art.

Beneficial features of the present invention include, but are not limited to the following. The database logs all information regarding a customer's purchases, made both on-line and off-line. The customer does, however, have the option to exclude from the database some or all purchases which are either a gift or sensitive in nature. As an expert system, as the database grows it will be able to more effectively customize selections to a customer's request.

In addition, a customer can browse and select the make, style and size of garments and post these preference for a gift registry, such as a bridal registry. Friends and relatives can receive electronic mailings that allow access to selected garments or the customer's preferences. The customer has the option to not divulge the size of the individual to friends and family having access to the registry. Instead, the size could be displayed as "unlisted," yet the database would still maintain this information and allow for gifts to be purchased in the recommended size.

Birthday and event reminders can be triggered based upon the customer's input. Periodically, a message alerting the customer of someone's birthday or anniversary can be sent to the customer, along with suggestions about gifts. If the gift recipient is already part of the system and database, the personal shopper can easily provide accurate and appropriate suggestions. If the gift recipient is not in the database, an invitation can be sent to join the system and database.

Feedback and post-purchase fit and satisfaction survey data can be used to continuously fine-tune the size fit technique and to improve personal preferences. This information can also be used to improve garment provider databases. Collaborative filtering, expert systems or other statistical approaches can be used to recommend related products and or cross-sell or up-sell products.

Numerous loyalty programs can also be used in conjunction with the system and method of the present invention where customers can receive cumulative discounts and points for continuous use of the system.

Additional embodiments and uses of the present invention using the three-dimensional scanning technology, the customer database and the physical infrastructure include the following:

Apparel-Related alternate embodiments of the present invention include, but are not limited to, custom clothing, made-to-measure clothing, shoes, gloves, hats; sporting apparel, pattern-making/sizing for people who sew or alter their own clothes; and uniforms for teams, schools, and groups.

Three-dimensional-body related or accuracy related alternate embodiments of the present invention include, but are not limited to, sporting equipment (equipment, protective gear, athletic wear); furniture (selection and design); home and personal products; cosmetics (matched or made for body/skin type); automotive, especially, ergonomics (car seats, baby seats); medical, prosthetic devices and diagnostic services; cosmetic surgery—visualization and solicitation; and health, diet, food—evaluation, recommendation, visualization and sales of products and services. This applies regardless of how the body measurement data is acquired.

Three dimensional-image related (personal/individual representation) alternate embodiments include, but are not limited to 3D Human "avatars" for chat and conferencing, "Net Meetings"; 3D gaming, arcade applications (location-based and Web-based); Entertainment, animation, cinema, interactive cinema; Creation of personal icons for Web applications; holographic products and next generation photography; Images of pets; Images of inanimate objects; and "Morphing" applications.

Database-Related alternate embodiments of the present invention include, but are not limited to, Financial Services, Credit Cards, "e-wallets," ATM networks; Direct to Consumer sales models, including reverse auctions; Demand Aggregation, "buying clubs," discounts; Demand forecasting, "futures buying, assisting manufactures with planning cycles, provide customers with guaranteed products at lower prices; Universal Gift Registry, Calendaring, Reminder applications; Creating "Communities" of people with like preferences, characteristics or interests; Dating Services; Security, keeping personal data in an "e-vault," using personal images/data/scanners as the ultimate in security, validation systems; Verification of physical handicaps for travel assistance, etc.; Database marketing, one-on-one marketing, couponing, customized offers; Warranty registration, centralized customer service interface to multiple vendors; "Personal Shopping" "virtual" agents; "Concierge" services and human shopping agents leveraging the databases; "Data mining," interlinking with supermarket barcode (UPC) scanning databases, credit database, travel, etc.; Anthropometric databases, sell to manufacturers, designers for product design, medical, military, ergonomic, statistical sampling; Legal records; and Personal databases.

VIII. Summary

This system, method and article of manufacture of garment-dependent curve development enables a highly scaleable fit prediction system, which is much more sophisticated than the prior art. It will produce results superior to those of the prior art for a very broad scope of garment styles, sizes, and fabrics. In addition, the system for providing this fit prediction technique will greatly improve on the current abilities of retailers, manufacturers and brands to provide to customers garment which most appropriate fit and suit the customer's needs.

All the features disclosed in this specification, including any accompanying abstract, and drawings, may be replaced by alternative features serving the same purpose, equivalents or similar purpose, unless expressly stated otherwise. Therefore, numerous other embodiments of the modifications thereof are contemplated as falling within the scope of the present invention as defined by the appended claims and equivalents thereto.

The techniques described herein are not limited to any particular hardware or software configuration; they may find applicability in any computing or processing environment. In addition, the techniques may be implemented in hardware or software, or a combination of the two.

What is claimed is:

1. A method for determining the fit of a garment on a user comprising the steps of:
   providing a first database to store and provide information including a set of fit scores which relate at least one of possible body dimension measurements to a corresponding garment dimension of a selected garment;
   receiving at least one user body dimension measurement for said user corresponding to said garment dimension;
   determining at least one user fit score for said garment dimension based at least in part on said at least one user body dimension measurement corresponding to said garment dimension;
   determining an overall fit score for said garment based at least in part on said at least one user fit score;
   providing said user with said overall fit score; and
   recommending a size of said garment to said user based at least in part on said overall fit score.

2. A method as defined in claim 1 wherein said first database also includes a second database to store and provide information including a purchase selection.

3. A method as defined in claim 2 wherein said garment dimension includes garment dimensions for a plurality of garments.

4. A method as defined in claim 2 further comprising receiving garment preference information from said user.

5. A method as defined in claim 2 further comprising the steps of:
   assigning a personal identifier to identify said user;
   storing said personal identifier in said second database; and
   providing said personal identifier to said user.

6. A method as defined in claim 5 further comprising providing said user with a user satisfaction survey and storing said user satisfaction survey in said second database.

7. A method as defined in claim 2 further comprising storing said at least one user body dimension measurement in said second database.

8. A method as defined in claim 7 wherein receiving said at least one user body dimension measurement includes receiving said at least one user body dimension measurement from a three-dimensional body scanner.

9. A method as defined in claim 8 wherein said three-dimensional body scanner also includes a scanning booth.

10. A method as defined in claim 7 wherein receiving said at least one user body dimension measurement includes receiving said at least one user body dimension measurement by using a tape measure.

11. A method as defined in claim 10 wherein said tape measure includes an electronic tape measure.

12. A method for determining the fit of a garment on a user comprising the steps of:
   providing a first database to store and provide information including a set of fit scores which relate at least one of possible body dimension measurements to a corresponding garment dimension of a selected garment;
   receiving at least one user body dimension measurement for said user corresponding to said garment dimension; and
   determining at least one user fit score for said garment dimension based at least in part on said at least one user body dimension measurement corresponding to said garment dimension,
   wherein determining at least one user fit score further includes developing at least one fit curve on an xy-axis with an x-axis representing said at least one possible body dimension measurement for said corresponding garment dimension and a y-axis representing one of said at least one fit score for said corresponding garment dimension.

13. A method as defined in claim 12 wherein said at least one user fit score includes a fit score between a specified range having limits, wherein said limits of said specified range represent an unwearable fit and a perfect fit.

14. A method as defined in claim 13 wherein said specified range is between 0 and 1; and wherein a fit score of 0 represents an unwearable fit and a fit score of 1 represent a perfect fit.

15. A method as defined in claim 14 wherein said fit curve includes a linear segment representing a perfect user fit range, a linear segment representing a near perfect user fit range tighter than a perfect user fit, a linear segment representing a near perfect user fit range larger than a perfect fit, a linear segment representing a small but wearable user fit range, a linear segment representing a loose but wearable user fit range, a linear segment representing a small but marginally wearable user fit range, a linear segment representing a loose but marginally wearable user fit range, and a linear segment representing an unwearably small user fit range, wherein any point on a segment corresponds to a user fit score.

16. A method as defined in claim 15 wherein said fit curve further includes a linear segment representing an unwearably loose user fit range.

17. A method as defined in claim 13 further comprising storing said fit curve in said first database.

18. A method as defined in claim 17 wherein determining said at least one user fit score further comprises evaluating said at least one user body dimension measurement using said at least said fit curve, and determining a corresponding one of said at least one user fit score.

19. A method as defined in claim 18 further including determining a dimensional fit rating comprising the steps of:

comparing said at least one user dimension measurements to possible body dimension measurements for said selected garment for each garment dimension; and determining at least one star rating for said garment by multiplying each one of said at least one user fit score for each said garment dimension; wherein said at least one star rating corresponds to a size of said selected garment.

20. A method as defined in claim 19 wherein said star rating includes a relative weighting factor.

21. A method as defined in claim 20 wherein said star rating includes a scaling factor.

22. A method as defined in claim 20 wherein said star rating includes a scaling factor.

23. A method as defined in claim 3 further comprising providing access to information relating to said fit of a garment on a user.

24. A method as defined in claim 23 wherein providing access to said information includes paying a fee for said access.

25. A method as defined in claim 23 further comprising providing said user with an identification card for accessing said information.

26. A method as defined in claim 24 wherein accessing said information includes accessing said information on a website.

27. A method as defined in claim 24 wherein accessing said information includes accessing said information from a wireless personal data assistant.

28. A method as defined in claim 24 wherein accessing said information includes accessing said information from a self-service kiosk.

29. A system for determining the fit of a garment for a user, said system comprising:

a user network access device for inputting and retrieving information; said user network access device connected to a public access network and in communication with a processor; said processor for accepting, evaluating, providing and maintaining information to determine a user fit of a garment for said user;

a garment provider network access device in communication with said processor;

a body measurement device;

said processor having a first database to store and provide information; said first database including a set of fit scores which relate at least one of possible first body dimension measurements to a corresponding first garment dimension of a selected garment; wherein said processor receives a first body dimension measurement for said user; and determines a user fit score for said garment dimension corresponding to said user first body dimension measurement.

30. A system as defined in claim 29 wherein said first body dimension measurements include second body dimension measurements and said first garment dimension includes a second garment dimension.

31. A system as defined in claim 30 wherein said body measurement device includes a three-dimensional body scanner.

32. A system as defined in claim 31 wherein said three-dimensional body scanner includes a scanning booth.

33. A system as defined in claim 32 wherein said body measurement device includes an electronic tape measure connected to said first user network access device for electronically inputting user body measurements.

34. A system as defined in claim 30 wherein said body measurement device includes a tape measure for recording said user body measurement and manually inputting said first user body measurement into said user network access device.

35. A system as defined in claim 30 wherein said processor receives information from said garment network access device including garment dimensions.

36. A method as defined in claim 19 further comprising the steps of:

comparing one of said at least one star rating of said selected garment to a second of said at least one star rating corresponding to a different size of said selected garment;

selecting a preferred star rating corresponding to one of said compared star ratings; and providing said user a size of said garment selection with said preferred star rating.

* * * * *